United States Patent
Terho (10) Patent No.: US 10,962,395 B2
(45) Date of Patent: Mar. 30, 2021

(54) METHOD AND APPARATUS FOR MEASURING THE FLOW RATE OF A SHIELDING GAS MIXTURE

(71) Applicant: KEMPPI OY, Lahti (FI)

(72) Inventor: Tuomas Terho, Lahti (FI)

(73) Assignee: KEMPPI OY, Lahti (FI)

( * ) Notice: Subject to any disclaimer, the term of this patent is extended or adjusted under 35 U.S.C. 154(b) by 0 days.

(21) Appl. No.: 16/609,265

(22) PCT Filed: Apr. 25, 2018

(86) PCT No.: PCT/FI2018/050297
§ 371 (c)(1),
(2) Date: Oct. 29, 2019

(87) PCT Pub. No.: WO2018/215691
PCT Pub. Date: Nov. 29, 2018

(65) Prior Publication Data
US 2020/0049541 A1    Feb. 13, 2020

(30) Foreign Application Priority Data

May 2, 2017   (FI) ..................................... 20175385

(51) Int. Cl.
*G01F 1/69*        (2006.01)
*G01F 1/68*        (2006.01)
(Continued)

(52) U.S. Cl.
CPC .......... *G01F 1/6965* (2013.01); *B23K 9/0956* (2013.01); *B23K 9/16* (2013.01);
(Continued)

(58) Field of Classification Search
None
See application file for complete search history.

(56) References Cited

U.S. PATENT DOCUMENTS 6,450,024 B1    9/2002  McCulloch et al.
7,015,412 B1    3/2006  Uttrachi
(Continued)

FOREIGN PATENT DOCUMENTS

JP    2006-136938 A    6/2006
WO    WO 2016/022130 A1    2/2016

OTHER PUBLICATIONS

International Search Report and Written Opinion dated Jul. 27, 2018 corresponding to International Patent Application No. PCT/FI2018/050297.

(Continued)

*Primary Examiner* — Harshad R Patel
(74) *Attorney, Agent, or Firm* — Squire Patton Boggs (US) LLP (57) ABSTRACT

The disclosure relates to a sensor apparatus and a method for measuring the flow rate of a shielding gas in a welding apparatus. The sensor apparatus comprises at least one inlet and at least one outlet in fluid connection with one or more bypass channels and with one or more sensor channels, and at least one input hose and one output hose. The apparatus also comprises one or more thermal mass flow sensors connected to the one or more sensor channels, and a control unit configured to retrieve sensor responses from the one or more thermal mass flow sensors and to determine the flow rate of the shielding gas through the sensor apparatus based on the retrieved sensor response and calibration data, wherein the calibration data comprises one or more characteristic curves comprising gas flow values and sensor response values. The control unit is configured to retrieve from a memory unit: the composition of the shielding gas; the number of active thermodynamic degrees of freedom which the molecules of each gas component in the shielding (Continued)

gas possess at the retrieved shielding gas temperature; a characteristic curve for each gas component separately, which consists of sensor response data as a function of gas flow rate, measured in a calibration experiment conducted with a pure gas consisting only of that gas component. The control unit is configured to calculate a new, mixture-specific characteristic curve for the gas mixture as a weighted average of the pure-gas characteristic curves, wherein the weight assigned to each value on a pure-gas characteristic curve is a product of the concentration percentage of that gas component in the shielding gas mixture and the number of active thermodynamic degrees of freedom which the molecules of that gas component possess at the retrieved shielding gas temperature; and to use the mixture-specific characteristic curve as the characteristic curve for the shielding gas mixture by retrieving from this characteristic curve the calibration gas flow rate which corresponds most closely to the retrieved new sensor response; and to identify this flow rate as the current flow rate of the shielding gas through the sensor apparatus. The sensor apparatus also comprises a display unit configured to display the determined flow rate of the shielding gas to a user and/or a memory unit for storing the determined flow rate of the shielding gas.

9 Claims, 8 Drawing Sheets

(51) Int. Cl.
| | | |
|---|---|---|
| *B23K 9/09* | (2006.01) | |
| *B23K 9/16* | (2006.01) | |
| *G01F 1/696* | (2006.01) | |
| *B23K 9/095* | (2006.01) | |
| *G01F 1/684* | (2006.01) | |
| *G01F 15/04* | (2006.01) | |
| *G01F 15/12* | (2006.01) | |
| *G01F 25/00* | (2006.01) | |

(52) U.S. Cl.
CPC .......... *G01F 1/6842* (2013.01); *G01F 15/043* (2013.01); *G01F 15/125* (2013.01); *G01F 25/0053* (2013.01)

(56) References Cited

U.S. PATENT DOCUMENTS

| | | |
|---|---|---|
| 7,019,248 B1 | 3/2006 | Uttrachi |
| 9,227,263 B2 | 1/2016 | Enyedy et al. |
| 2010/0000608 A1* | 1/2010 | Goto ........................ G01F 5/00 137/2 |
| 2015/0298237 A1 | 10/2015 | Zimmer et al. |
| 2016/0001391 A1 | 1/2016 | Nacey et al. |
| 2016/0245681 A1* | 8/2016 | Maginnis ................ G01F 1/688 |

OTHER PUBLICATIONS

Finnish Search Report dated Nov. 17, 2017 corresponding to Finnish Patent Application No. 20175385.

Tuomas Terho: "Measuring flow rate of mixture gases—Developing a digital gas flow meter for industrial welding solutions," Lahti, Finland: Lahti University of Applied Sciences, May 4, 2017, XP055493669.

* cited by examiner

METHOD AND APPARATUS FOR MEASURING THE FLOW RATE OF A SHIELDING GAS MIXTURE

FIELD OF THE DISCLOSURE

The present disclosure relates to shielding gases used in gas metal arc welding, and more particularly to methods for measuring the flow rate of shielding gases with thermal mass flow sensors.

BACKGROUND OF THE DISCLOSURE

In gas metal arc welding, an electric arc burns between an electrode and a workpiece. The electrode extends outward from a tubular gas nozzle, and a shielding gas which surrounds the electrode also flows through the nozzle towards the work piece during welding. The shielding gas prevents impurities from coming into contact with the melted weld and controls heat input. The shielding gas also stabilizes the weld by preventing splatter. The shielding gas may be inert, or it may be a reactive gas which may interact chemically with the weld, for example by reducing or increasing oxidation.

Shielding gases typically comprise argon, helium, oxygen, hydrogen, nitrogen and carbon dioxide, either as a pure gas which comprises only one of these gas components, or as a gas mixture which comprises two or more of them. In addition to the six gases listed above, shielding gas mixtures may comprise small amounts of other gaseous components. In order to continuously monitor and optimize shielding gas usage, the weld operator should preferably know the instantaneous flow rate of the shielding gas to be able to control it accurately. This requires equipment for continuous flow rate measurements, which must be integrated with the welding equipment.

Shielding gas mixtures are typically bought as ready-made mixture. The manufacturer specifies the concentration percentage of each gas component in the mixture, usually with error limits. The number of available shielding gas mixtures is very large because the six basic shielding gases listed above can be combined to produce many possible gas combinations, and the concentration percentages of each gas component in a given combination can vary within broad ranges.

Shielding gas flow rate measurements should therefore preferably be conducted with a sensor apparatus which can perform accurate flow rate measurements on a great number of different shielding gas mixtures. It is possible to conduct intermittent flow rate measurements on all gas mixtures with flow sensors which can be placed near the gas nozzle temporarily. However, intermittent measurements are often inconvenient and yield much less information than a continuous measurement would.

Shielding gas flow rate measurements should also preferably be conducted relatively close to the gas nozzle, because some of the shielding gas may leak as it proceeds downstream from the gas source to the nozzle. In summary, there is a need for a relatively small and mobile sensor apparatus for measuring the flow rate of a shielding gas, capable of performing accurate flow rate measurements for a wide variety of shielding gases.

Document U.S. Pat. No. 6,450,024 discloses an apparatus for determining the mass flow rate of a fluid using thermal means, but it does not disclose a sensor which could be conveniently integrated to a welding apparatus.

BRIEF DESCRIPTION OF THE DISCLOSURE

An object of the present disclosure is to provide a method for continuously measuring shielding gas flow rates and an apparatus for implementing the method.

The objects of the disclosure are achieved by a method and an apparatus which are characterized by what is stated in the independent claims. The preferred embodiments of the disclosure are disclosed in the dependent claims.

The disclosure is based on the idea of conducting continuous shielding gas flow measurements with a mobile measurement system which is sufficiently compact to be integrated into the shielding gas distribution system in a downstream location close to the gas nozzle without hindering the welding process.

An advantage of the method and apparatus of the disclosure is that the flow rate of the shielding gas can be continuously monitored and adjusted during the welding process.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

This disclosure describes a sensor apparatus for measuring the flow rate of a shielding gas in a welding apparatus, comprising at least one inlet and at least one outlet, wherein the at least one inlet is in fluid connection with one or more bypass channels and with one or more sensor channels for leading fluid into the sensor apparatus. The at least one outlet is in fluid connection with the same bypass channels and sensor channels as the at least one inlet for leading fluid out of the sensor apparatus. At least one input hose is connected to the at least one inlet and configured to transfer the shielding gas to the sensor apparatus. At least one output hose is connected to the at least one outlet and configured to transfer the shielding gas out of the sensor apparatus and towards the weld.

The apparatus also comprises one or more thermal mass flow sensors connected to the one or more sensor channels, and a control unit configured to retrieve sensor responses from the one or more thermal mass flow sensors and to determine the corresponding flow rate of the shielding gas through the sensor apparatus based on the retrieved sensor response and calibration data, wherein the calibration data may comprise one or more calibration curves comprising gas flow values and sensor response values.

In this disclosure, the term "flow rate" is used as a general term for volumetric flow rate (expressed, for example, in litres/second) or mass flow rate (expressed, for example, in kilograms/second). Multiplication by the shielding gas density converts volumetric flow rate into mass flow rate, but concentration percentages must be taken into account in the density calculation if the shielding gas is a mixture.

The control unit may comprise a computer with data processors. The apparatus may also comprise a display unit configured to display the determined flow rate of the shielding gas to a user and/or a memory unit for storing the determined flow rate of the shielding gas. The display unit may be a screen connected to the computer and the memory unit may be a memory card connected to the computer. The control unit may also comprise communication means for transferring the determined flow rate to other data processing units in a computer network. The communication means may for example include a wireless data link such as Bluetooth, Wifi, or GSM/3G/4G, or a wired data link.

Figure 1:
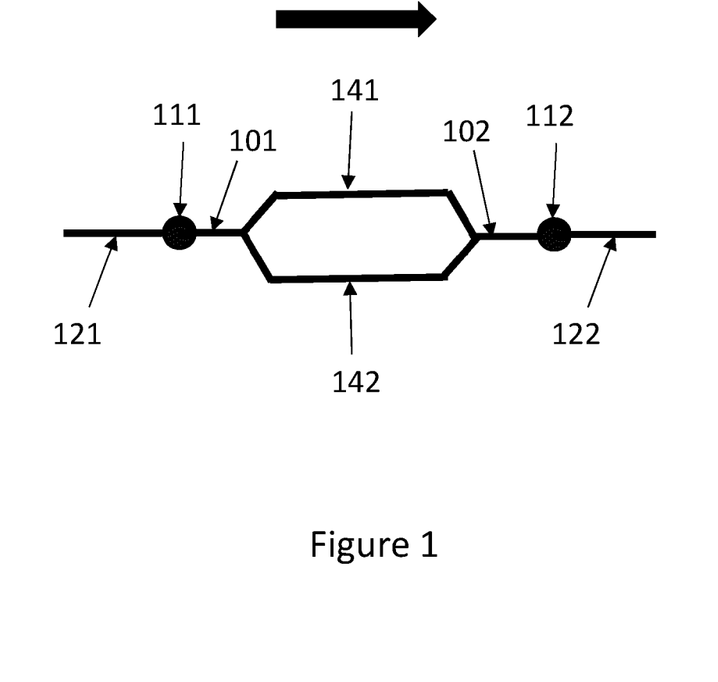
FIG. 1 is a schematic presentation of fluid connections in a sensor apparatus.

FIG. 1 is a schematic presentation of fluid connections in a sensor apparatus with an inlet 111, an outlet 112, an input hose 121 and an output hose 122. Between the inlet 111 and outlet 112 there is one or more bypass channels 141 and one or more sensor channels 142. The majority of the shielding gas flow may be diverted to the one or more bypass channels, while a smaller flow may be diverted to the sensor channels. The apparatus may comprise an additional fluid passage 101 between the inlet 111 and the point where the fluid flow to the bypass channel 141 diverges from the flow to the sensor channel 142. A similar additional fluid passage 102 may be located between the point where these flows recombine and the outlet 112. Alternatively, the fluid flow to the bypass channel 141 may diverge from the fluid flow to the sensor channel immediately at the inlet 111, and the flows may recombine at the outlet 112. The arrow points in the downstream direction in FIG. 1.

Figure 2:
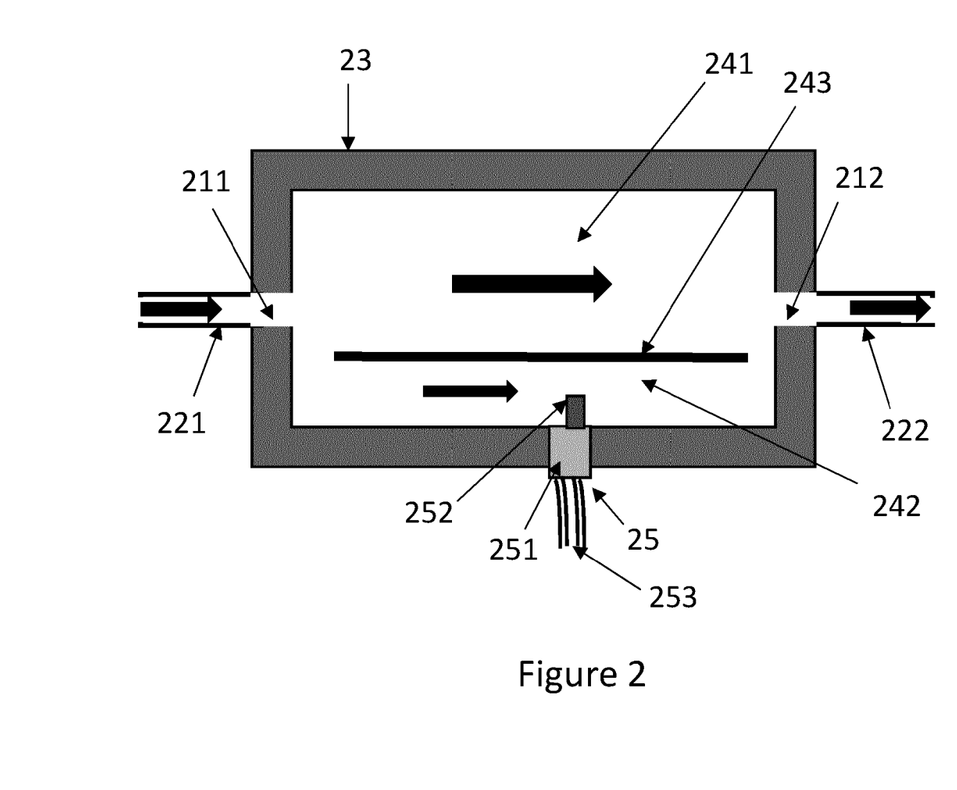
FIG. 2 illustrates a sensor apparatus according to one embodiment.

FIG. 2 illustrates a sensor apparatus according to one embodiment. The apparatus comprises an inlet 211 and an outlet 212, as well as an input hose 221 and an output hose 222. The shielding gas arrives to the sensor apparatus from the input hose 221, proceeds downstream through the sensor apparatus and exits the sensor apparatus in output hose 222. The illustrated sensor apparatus comprises a sensor chamber 23 with sidewalls which may have a cylindrical, cuboid or prismatic shape. The sensor chamber comprises a bypass channel 241 and a sensor channel 242. The bypass channel and sensor channel are separated from each other by a channel wall 243. The bypass channels and sensors channel may be cylindrical, cuboid or prismatic ducts. The number of bypass channels may greater than one, and there may be more than one sensor channel.

The examples presented below will illustrate sensor apparatuses with sensor chambers such as the one in FIG. 2, but the apparatus can also be implemented without a fixed chamber. For example, either the bypass channel or the sensor channel, or both, may be hoses connected in parallel. In this case, the inlet may be a first fork connection where the shielding gas stream arriving from the inlet hose is divided into one hose which functions as the bypass channel and another hose functioning as the sensor channel. The outlet may correspondingly be a second fork connection where the shielding gas streams arriving from the bypass channel and the sensor channel join together and proceed to the output hose. Furthermore, whether the sensor apparatus comprises a sensor chamber or not, the sensor apparatus may comprise more than one inlet, more than one outlet, more than one bypass channel and more than one sensor channel.

The shielding gas flow through the one or more bypass channels will typically be larger than the shielding gas flow through the one or more sensor channels. However, the relative and absolute sizes of the bypass channels and sensor channels may be optimized for different purposes.

The sensor apparatus illustrated in FIG. 2 comprises a thermal mass flow sensor 25 in sensor channel 242. The thermal mass flow sensor may comprise a sensor body 251, a measurement tip 252 and electrical connections 253. The sensor body may in this case be incorporated into one sidewall of the sensor chamber 23 and the measurement tip 252 may protrude into the sensor channel 242. The thermal mass flow sensor may be connected as a hot-wire anemometer, such as a constant temperature anemometer, constant current anemometer, or constant voltage anemometer. The thermal mass flow sensor may also be a sensor integrated into the wall of the sensor channel with no parts protruding into the sensor channel, such as a thermal dispersion flow meter.

By way of example, the operation principle of the thermal mass flow sensor 25 as a constant temperature anemometer (CTA) will be described in more detail. A resistive temperature sensor for monitoring the temperature of the shielding gas may be integrated into thermal mass flow sensor 25. Alternatively, the temperature of the shielding gas may be measured with a separate resistive temperature sensor. In either case, the control unit may be programmed to read shielding gas temperature values $T_{SG}$ from the temperature sensor and to maintain the measurement tip 252 of the thermal mass flow sensor 25 at a tip temperature $T_T$ which is higher than the shielding gas temperature $T_{SG}$ by a certain constant amount. In other words, $T_T=T_{SG}+\Delta T$, where $\Delta T$ may for example be in the range 10-100° C. The measurement tip 252 may be maintained at this temperature $T_T$ by a heating resistor located in the tip.

Figure 3:
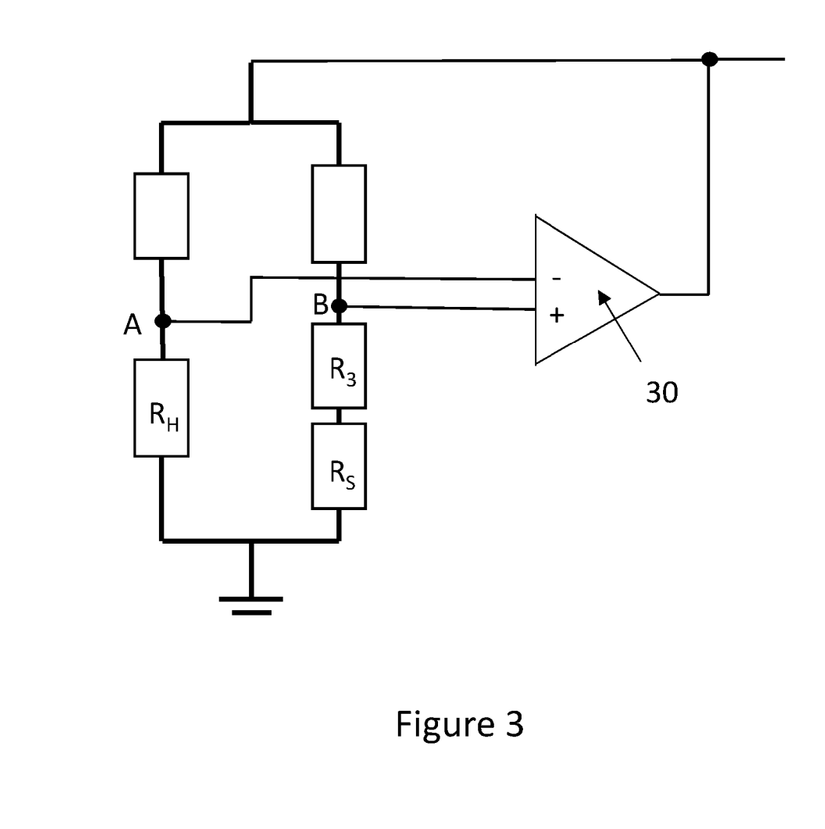
FIG. 3 illustrates the measurement principle of a constant-temperature anemometer.

The heating resistor in the tip, indicated by $R_H$, may be connected in a Wheatstone bridge with the temperature sensor, indicated by $R_S$, as schematically illustrated in FIG. 3, and an offset resistor $R_3$. The offset resistor is used to set the constant temperature difference $\Delta T$ between the measurement tip 252 and the shielding gas. If the shielding gas flow increases and begins to cool the measurement tip more than before, the bridge goes out of balance. The operational amplifier 30 reacts to this unbalanced state by increasing the voltage over the bridge, which returns the bridge to balance.

Figure 4:
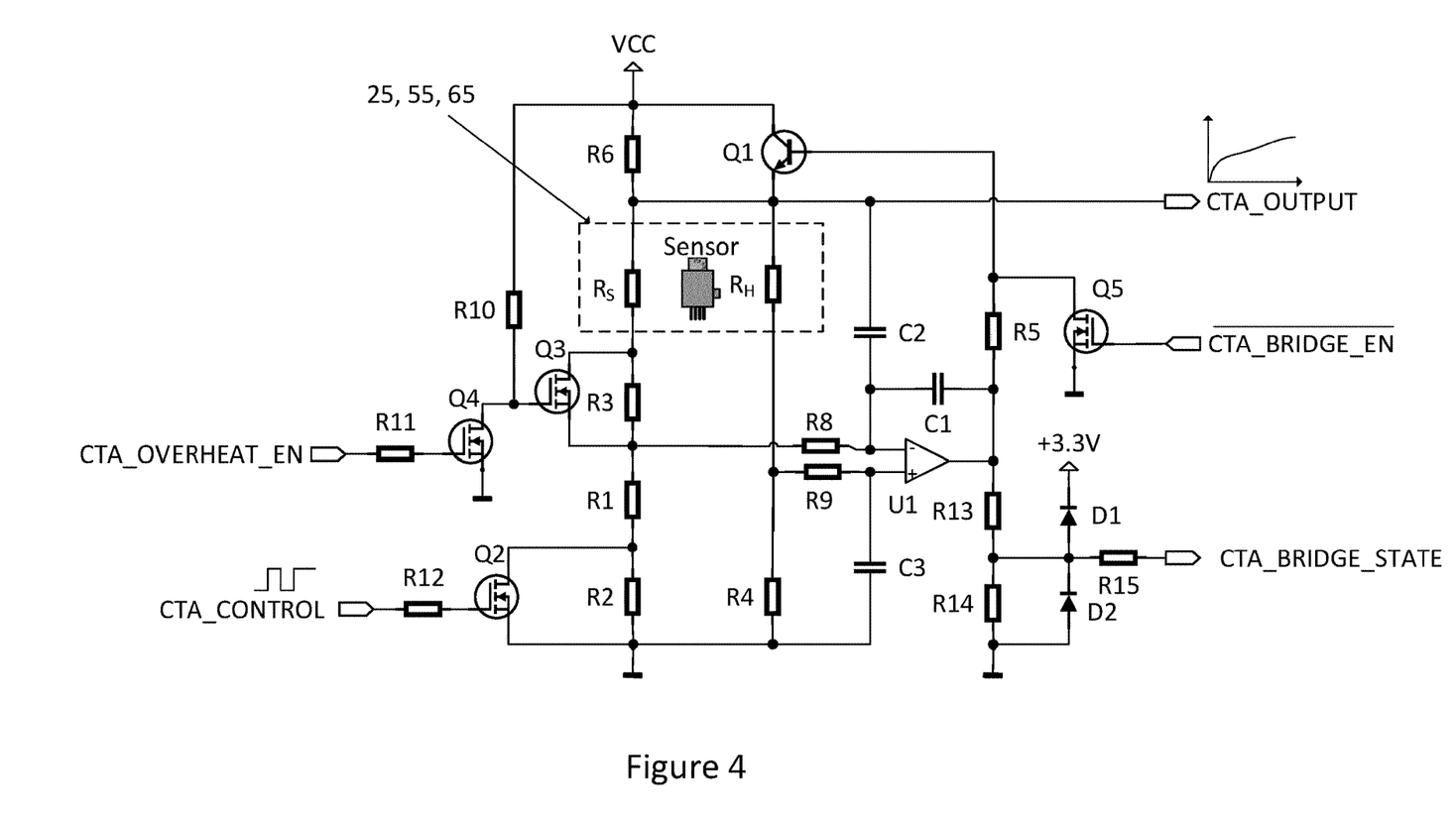
FIG. 4 illustrates an exemplary measurement circuit for a constant-temperature anemometer in a sensor apparatus for measuring the flow rate of a shielding gas.

FIG. 4 illustrates in more detail an exemplary measurement circuit for a CTA in a sensor apparatus for measuring the flow rate of a shielding gas according to any embodiment in this disclosure. The Wheatstone bridge includes resistors $R_S$, R3, R1, R2, $R_H$ and R4. A voltage difference U1 arises if the branch $R_S$-R3-R1-R2 is not in balance with the branch $R_H$-R4. When the bridge is balanced, no voltage is applied to transistor Q1, so it conducts no current. An increase in the shielding gas flow rate changes the temperature of the measurement tip and the resistance $R_H$. The voltage difference U1 then becomes nonzero and Q1 conducts current. The increase in power applied to the bridge is detected in the voltage measurement CTA_OUTPUT over the two input branches of the Wheatstone bridge. This bridge voltage output thereby becomes a sensitive measure of the shielding gas flow rate. A decreased flow rate decreases the voltage output in a similar manner.

The bridge may be calibrated as follows. The resistor R3 can be short-circuited by setting transistor Q4 to a conductive state, and the bridge-controlling transistor Q1 can be turned off by setting transistor Q5 to a conductive state. The bridge can then be balanced with the help of the current driven through resistor R6 by the bridge supply voltage VCC by pulsing the calibration resistor R2 through field-effect transistor Q2. The effect of the resistor R2 may be changed by varying the pulse width. The pulse width needed for balancing the bridge may be stored as a calibration parameter and utilized every time a measurement is performed. The balanced state of the bridge during calibration may be determined from the potential CTA_BRIDGE_STATE.

Capacitors C2 and C3 protect the voltage input U1, while capacitor C1 performs an integrating function for the operational amplifier which slows the voltage response at CTA_OUTPUT. The capacitors C1-C3 also prevent the pulse width modulation at Q2-R2 from influencing the voltage CTA_OUTPUT.

The control unit may be configured to convert the sensor responses obtained from the thermal mass flow sensor (which, in the CTA example outlined above, correspond to the CTA_OUTPUT voltages) into corresponding shielding gas flow rates. More generally, the sensor response is an electric measurement value which may be a voltage or a current depending on the sensor type and the measurement setup. The conversion requires calibration data obtained from calibration experiments which will be described in more detail below. The apparatus may also comprise a display unit and/or a memory unit. The control unit may be configured to display the measured shielding gas flow rate on the display unit, where a weld operator can see it, and/or to store the measured shielding gas flow rate in the memory unit. The control unit may also be configured to transfer the measured shielding gas flow rates to other computers in a computer network through wireless or wired data connections.

In the sensor apparatus illustrated in FIG. 2, the distribution of shielding gas flow between the bypass channel and the sensor channel may not remain constant at different flow rates. Turbulence may change the distribution so that a smaller portion of the shielding gas flow is diverted to the sensor channel when the shielding gas flow is high than when it is low, or vice versa. This problem may be circumvented with filters placed between the inlet and the entrance to the channels.

Figure 5:
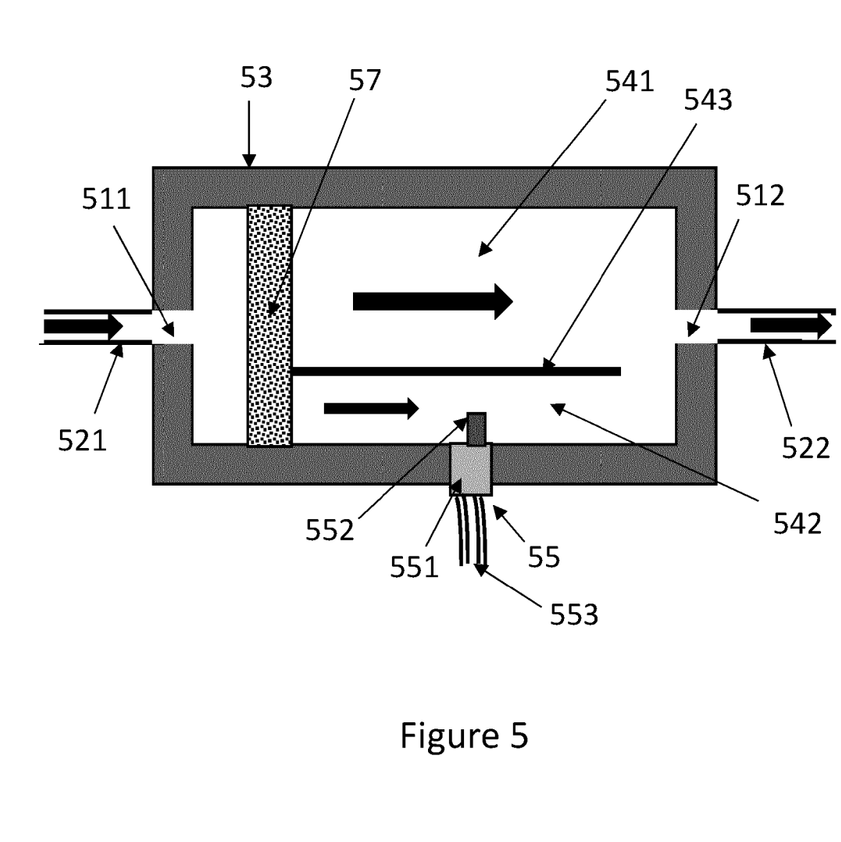
FIG. 5 illustrates a sensor apparatus according to one embodiment.

FIG. 5 illustrates a sensor apparatus according to one embodiment. The parts marked with reference numbers 511-512, 521-522, 53, 541-542, 55 and 551-553 in FIG. 5 correspond to the parts marked with reference numbers 211-212, 221-222, 23, 241-242, 25 and 251-253, respectively, in FIG. 2. The apparatus also comprises a filter 57 covering the entrance to the bypass channel 541 and the entrance to the sensor channel 542. The filter may, for example, be a sintered-metal filter. A porous filter can smoothen the shielding gas flow by diverting it into multiple small paths which makes the flow turbulent, reduces its entry length and distributes the gas evenly between the bypass channel and the sensor channel. It may also improve the resolution of the sensor apparatus by reducing the flow rate in the sensor channel.

Figure 6:
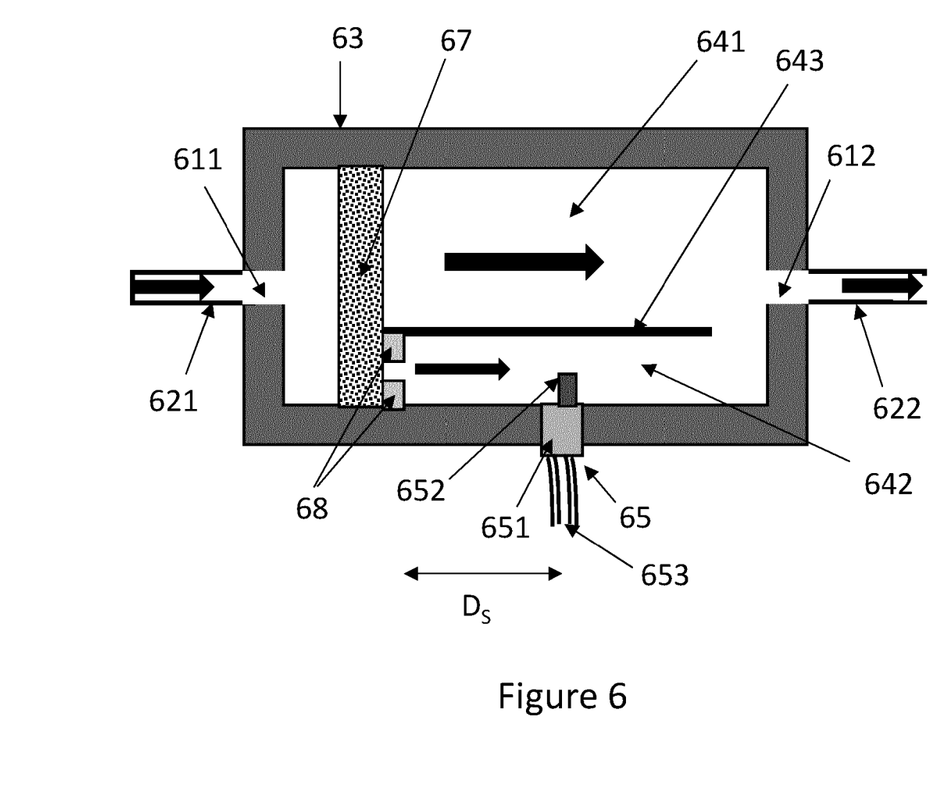
FIG. 6 illustrates a sensor apparatus according to one embodiment.

Although thermal mass flow sensors can be used to measure turbulent gas flows, the flow rate measurement results may in some cases be more reliable if the shielding gas flow is laminar in the sensor channel. FIG. 6 illustrates a sensor apparatus according to one embodiment. The parts marked with reference numbers 611-612, 621-622, 63, 641-642, 65, 651-653 and 67 in FIG. 6 correspond to the parts marked with reference numbers 511-512, 521-522, 53, 541-542, 55, 551-553 and 57, respectively, in FIG. 5. The sensor apparatus in FIG. 6 also comprises a choke 68 for converting the shielding gas flow in the sensor channel 642 into laminar flow. The choke may, for example, be a nylon tube choke with a suitable inner diameter.

The distance $D_S$ from the choke 68 to the sensor 65 may be optimized so that the laminar shielding gas flow in the sensor channel has enough time to obtain a fully developed parabolic velocity profile before it reaches the sensor 65. If the sensor channel 642 has a circular cross-section with a diameter in the range 3.5 mm-5.0 mm, the choke may, for example, have an inner diameter of 1.0-2.0 mm and the distance $D_S$ may, for example, be 35-50 mm. The sensor apparatus may comprise two bypass channels 641 with circular cross sections in the range 6.0 mm-9.0 mm. The dimensions of all components may be optimized based on the expected maximum flow rate and the placement of the sensor apparatus in the welding apparatus.

This disclosure also describes a method for measuring the flow rate of a shielding gas through a sensor apparatus as described above. The method comprises configuring a control unit to read a new sensor response from the one or more thermal mass flow sensors and, upon retrieving a new sensor response, to determine the corresponding flow rate of the shielding gas through the sensor apparatus based on the retrieved sensor response and calibration data, wherein the calibration data comprises one or more calibration curves comprising gas flow values and sensor response values. The method also comprises the step of configuring the control unit to display the determined flow rate of the shielding gas to a user on a display unit, and/or to store the determined flow rate of the shielding gas in a memory unit, and/or to transfer the determined flow rate of the shielding gas to other data processing units in a computer network.

Figure 7:
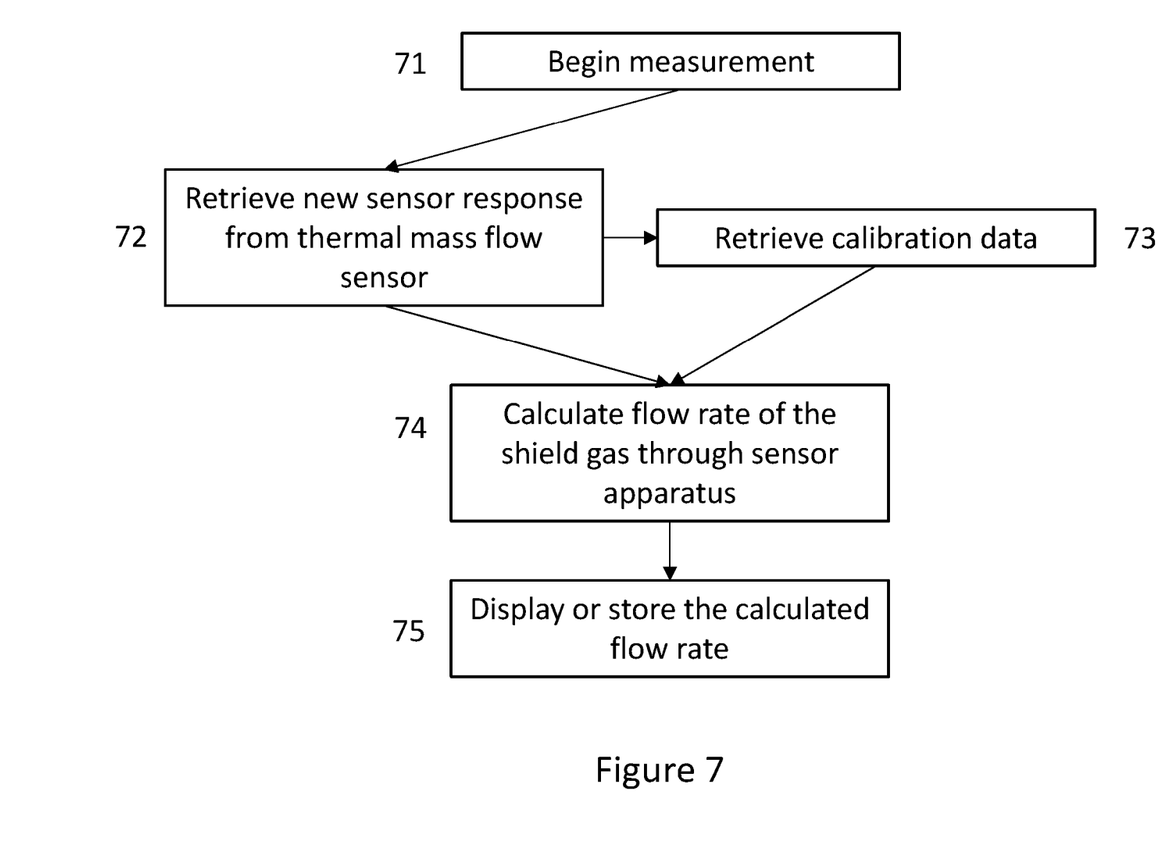
FIG. 7 illustrates a method for measuring the flow rate of a shielding gas according to one embodiment.

FIG. 7 illustrates the steps which the control unit performs in this method. The method may be repeated continuously, so that the control unit is configured to return to step 71 immediately after reaching step 75. The control unit may also be configured to initiate step 71 at regular intervals. The calibration data may have been stored in the memory unit, so that the control unit can retrieve this data from the memory unit in step 73. The calibration data may be obtained from one or more calibration experiments conducted with a calibration apparatus, which may be either the sensor apparatus itself or an apparatus identical to the sensor apparatus.

The shielding gas may be either a pure gas consisting of only one gas component, or a gas mixture consisting of two or more gas components, where the concentration percentage of each gas component is known. The concentration percentage may be a volume percentage, mass percentage or molar fraction.

The sensor apparatus may be calibrated for each pure gas and each gas mixture separately. In this case, a calibration gas may be driven through the calibration apparatus and through a calibration flow rate sensor which may be connected in series with the calibration apparatus. The calibration gas may be a pure gas or a gas mixture. The flow rate of the calibration gas may then be changed as a function of time. The control unit of the calibration apparatus may retrieve calibration gas flow rate values from the calibration flow rate sensor as the flow rate of the calibration gas is changed and store the retrieved calibration gas flow rate values in a memory unit. The control unit of the calibration apparatus may simultaneously retrieve sensor responses from the one or more thermal mass flow sensors in the calibration apparatus and store the retrieved sensor responses in the memory unit. Each sensor response in the calibration data thereby corresponds to a calibration gas flow rate measured by the calibration flow rate sensor.

The calibration data can be obtained by performing calibration experiments for each pure gas separately and for each gas mixture separately. The calibration flow rate sensor may be connected to the hose through which the calibration gas exits or enters the calibration apparatus. The calibration flow rate sensor may be any flow rate sensor which is known to be accurate. The flow rate of the calibration gas and the thermo-electrical response of the thermal mass flow sensor in the calibration apparatus can thereby be simultaneously measured while the flow rate of the calibration gas is varied, so that a calibrated correspondence is obtained between the flow rates of the calibration gas and the sensor responses retrieved from the thermal mass flow sensor. The resulting data may be called a calibration curve or a characteristic curve.

Once the calibration data has been obtained, it can be copied to multiple memory units and used by the control unit of each sensor apparatus. The control unit of the sensor apparatus may then execute the method for measuring the unknown flow rate of a shielding gas currently flowing through the sensor apparatus by retrieving a new sensor response from the thermal mass flow sensor connected to the sensor channel in the sensor apparatus. The control unit may be configured to then determine the corresponding flow rate of the current shielding gas by retrieving from a memory unit the calibration curve which was measured with a calibration gas which was identical to the current shielding gas. The calibration curve may consist of sensor response data as a function of gas flow rate, measured in a calibration experiment. The control unit may retrieve from the calibration curve the calibration gas flow rate which corresponded most closely to the retrieved new sensor response, and identify this flow rate as the current flow rate of the shielding gas through the sensor apparatus Since hot-wire anemometers are sensitive to the composition of the gas, a calibration curve obtained for one shielding gas mixture may not be valid for another mixture, even if the differences between the mixtures would be fairly small. Furthermore, the shielding gas mixtures which a given sensor apparatus will measure in the future may not be known when the calibration experiments are performed, so all alternatives would have to be covered. However, it may be very inconvenient to perform separate calibration experiments for each and every possible shielding gas mixture. The concentration of each gas in the shielding gas mixture may range from 0% to 100%, so the number of possible mixtures may become so large that a massive library of calibration data would have to be assembled in a great number of experiments to cover all possible alternatives. It may not be practically possible to assemble calibration data for all possible shielding gas mixtures. Consequently, calibration data may not always be available for every mixture.

One way to circumvent this problem is to assemble calibration data only for the pure gases which may be constituents in the shielding gas mixture, and to modify the calibration data mathematically when the unknown flow rate of a shielding gas mixture with known gas component concentration percentages is measured. The required pure gases typically include only six industrial gases: argon, helium, carbon dioxide, oxygen, hydrogen and nitrogen. The mathematical modification may involve the weighting of the calibration data obtained for a given pure gas with the concentration of that gas component in the shielding gas mixture and with the temperature-dependent number of thermodynamic degrees of freedom which the gas molecules in that gas components possesses.

The idea behind this calibration procedure is that the quantity of heat which a specific gas component in the shielding gas mixture is able to absorb from the thermal mass flow sensor depends (1) on its concentration in the shielding gas mixture and (2) on its specific heat capacity. Its specific heat capacity at a given temperature depends on the thermodynamic degrees of freedom of the gas molecules in this particular gas component at that temperature. Thermodynamic degrees of freedom can arise from translational, rotational and vibrational movement. A one-atomic gas molecule can have only three translational degrees of freedom, while a two-atomic gas can have three translational degrees of freedom and two rotational degrees of freedom. A polyatomic gas can have three translational degrees of freedom and three rotational degrees of freedom, but some three-atomic gases, such as carbon dioxide, behave like two-atomic gases.

The number of active thermodynamic degrees of freedom, which are "active" in the sense that they influence the specific heat capacity of the gas component, is a function of temperature. Temperature data must therefore be obtained from the shielding gas flow through the sensor apparatus in the method described below. This temperature data may be obtained from one or more temperature sensors which may be placed either in a bypass channel or a sensor channel within the sensor apparatus. The temperature data obtained from these sensors may also be used for calculating temperature corrections to the measured sensor response.

In this method, the control unit may be configured to determine the flow rate of the shielding gas corresponding to a retrieved new sensor response by first retrieving a shielding gas temperature value from a temperature sensor within the sensor apparatus, and then retrieving from a memory unit the composition of the shielding gas, comprising the concentration percentage of each gas component in the shielding gas. The composition of the shielding gas may have been stored in the memory unit before the welding operation began, for example as input data given by the user of the welding apparatus or as input data obtained from another computer through a data network.

The control unit may also be configured to retrieve from a memory unit the number of active thermodynamic degrees of freedom which the molecules of each gas component in the shielding gas possess at the retrieved shielding gas temperature, and pure-gas calibration curves which have been measured for each gas component separately.

The pure-gas calibration curve for each gas component may consist of sensor response data as a function of gas flow rate, measured in a calibration experiment conducted with a pure gas consisting only of that gas component. In other words, once the control unit has retrieved the composition of the current shielding gas, the control unit may proceed to separately retrieve the calibration data measured for pure gases corresponding to each of the gas components in the shielding gas.

The control unit may be configured to calculate new, mixture-specific calibration curve for the gas mixture. This calibration data may be a weighted average of the pure gas calibration curves. A calibration curve may be designated as $S(R)$. It expresses either a measured or a calculated sensor response S as a function of gas flow rate R. If the shielding gas is a mixture which comprises oxygen, carbon dioxide and argon, the control unit may for example retrieve the pure gas calibration curves $S_{O2}(R)$, $S_{CO2}(R)$ and $S_{AR}(R)$.

The mixture-specific calibration curve $S_{mix}$ may then be calculated as a weighted average with the formula $$S_{mix}(R_i) = \frac{\sum_n x_n f_n S_n(R_i)}{\sum_n x_n f_n}$$

where $R_i$ is a gas flow rate value, and the expected sensor response $S_{mix}$ is calculated as a sum over all gas components of shielding gas n=1, 2, 3 . . . . In other words, the subscript n refers to the gas components contained in the shielding gas mixture (for example oxygen, carbon dioxide and argon, in the example above). $x_n$ is the concentration percentage of gas component n in the shielding gas mixture, $f_n$ is the number of active thermodynamic degrees of freedom which the molecules of gas component n possess at the retrieved shielding gas temperature, and $S_n(R_i)$ is the sensor response which was measured in the calibration experiment for pure gas n at the gas flow rate $R_i$.

In other words, when the control unit calculates the mixture-specific calibration curve, the weight assigned to each value on a pure-gas calibration curve may be a product of the concentration percentage of that gas component in the shielding gas mixture and the number of active thermodynamic degrees of freedom which the molecules of that gas component possess at the retrieved shielding gas temperature. The control unit may be configured to repeat the calculation at several $R_i$ values to produce the mixture specific calibration curve $S_{mix}(R)$ which expresses the expected sensor response as a function of the shielding gas flow rate.

The control unit may be configured to use the mixture-specific calibration curve $S_{mix}(R_i)$ as the calibration curve for this specific shielding gas mixture, and to use the mixture-specific calibration curve as the calibration curve for the shielding gas mixture by retrieving from this calibration curve the calibration gas flow rate which corresponds most closely to the retrieved new sensor response. The control unit may be configured to identify this flow rate as the current flow rate of the shielding gas through the sensor apparatus.

Figure 8:
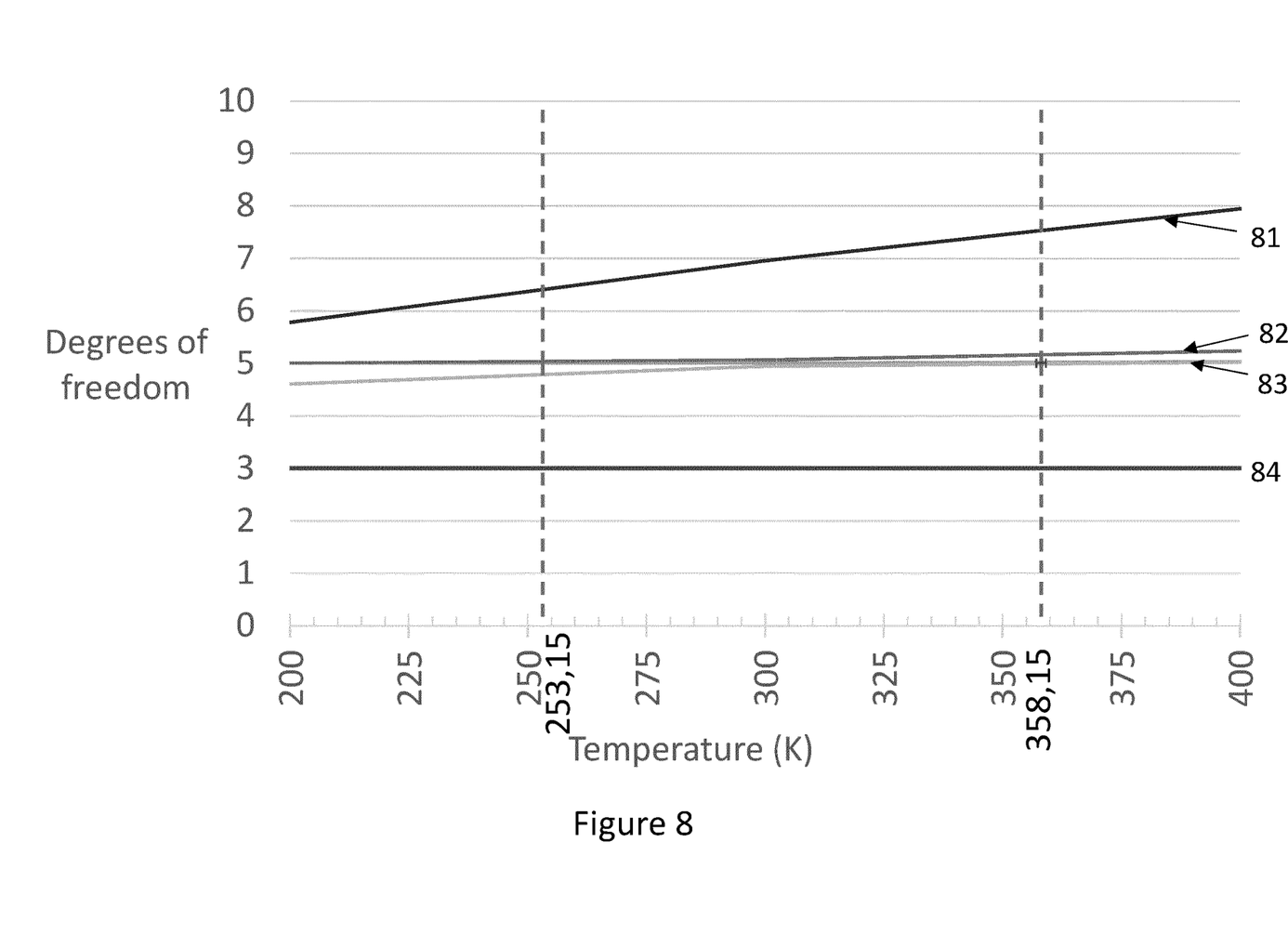
FIG. 8 illustrates graphs which show the active thermodynamic degrees of freedom of different pure gases as a function of temperature.

The data set which comprises the number of active thermodynamic degrees of freedom for molecules in different pure gases as a function of temperature may be a table of values. FIG. 8 illustrates such data in graphical form, where the dotted lines delimit a typical temperature range for gas metal arc welding. The curve 81 represents carbon dioxide, 82 represents oxygen, 83 represents hydrogen, and helium and argon are both represented by the curve 84. Nitrogen has five degrees of freedom throughout this range.

An additional temperature correction may in some cases be calculated to the shielding gas flow rate. Hot-wire anemometers are sensitive to temperature differences between the gas and the sidewalls of the sensor apparatus. As mentioned above, one or more temperature sensors may be inserted to sensor apparatus. They may be placed in the bypass channel or in the sensor channel, and/or integrated into the sidewalls of the sensor apparatus. The control unit may be configured to retrieve temperature values from these temperature sensors continuously, and to calculate temperature corrections to the flow rate of the shielding gas based on the retrieved temperature values.

The invention claimed is:

1. A sensor apparatus for measuring the flow rate of a shielding gas in a welding apparatus, said sensor apparatus comprising:
   at least one inlet and at least one outlet, wherein the at least one inlet is in fluid connection with one or more bypass channels and with one or more sensor channels for leading fluid into the sensor apparatus, and the at least one outlet is in fluid connection with the same bypass channels and sensor channels as the at least one inlet for leading fluid out of the sensor apparatus;
   at least one input hose connected to the at least one inlet and configured to transfer the shielding gas to the sensor apparatus;
   at least one output hose connected to the at least one outlet and configured to transfer the shielding gas out of the sensor apparatus and towards the weld;
   one or more thermal mass flow sensors connected to the one or more sensor channels; and
   a control unit configured to retrieve sensor responses from the one or more thermal mass flow sensors and to determine the corresponding flow rate of the shielding gas through the sensor apparatus based on the retrieved sensor response and calibration data, wherein the calibration data comprises one or more characteristic curves comprising gas flow values and sensor response values;
   a memory unit for storing the determined flow rate of the shielding gas,
   a display unit configured to display the determined flow rate of the shielding gas to a user or a communication device for transferring the determined flow rate of the shielding gas to other data processing units in a computer network,
   wherein the control unit is configured to determine the flow rate of the shielding gas corresponding to the retrieved new sensor response by
   retrieving a shielding gas temperature value from a temperature sensor within the sensor apparatus,
   retrieving from the memory unit the composition of the shielding gas, comprising the concentration percentage of each gas component in the shielding gas,
   retrieving from the memory unit the number of active thermodynamic degrees of freedom which the molecules of each gas component in the shielding gas possess at the retrieved shielding gas temperature,
   retrieving, from the memory unit, for each gas component separately, a characteristic curve which comprises sensor response data as a function of gas flow rate, measured in a calibration experiment conducted with a pure gas consisting only of that gas component,
   calculating a new, mixture-specific characteristic curve for the gas mixture as a weighted average of the pure-gas characteristic curves, wherein the weight assigned to each value on a pure-gas characteristic curve is a product of the concentration percentage of that gas component in the shielding gas mixture and the number of active thermodynamic degrees of freedom which the molecules of that gas component possess at the retrieved shielding gas temperature,
   using the mixture-specific characteristic curve as the characteristic curve for the shielding gas mixture by retrieving from this characteristic curve the calibration gas flow rate which corresponds most closely to the retrieved new sensor response, and identifying this flow rate as the current flow rate of the shielding gas through the sensor apparatus.

2. The apparatus according to claim 1, wherein the sensor apparatus comprises one or more filters covering the entrance to the one or more bypass channels and the entrance to the one or more sensor channels.

3. The apparatus according to claim 2, wherein the filter comprises a sintered-metal filter.

4. The apparatus according to claim 1, wherein the entrance to the one or more sensor channels comprises a choke.

5. The apparatus according to claim 1, wherein one or more temperature sensors are placed in the bypass channel or in the sensor channel, or integrated into the sidewalls of the sensor apparatus, and wherein the control unit is configured to retrieve temperature values from these temperature sensors continuously, and to calculate temperature corrections to the flow rate of the shielding gas based on the retrieved values.

6. The apparatus according to claim 1, wherein the control unit is configured to determine the flow rate of the shielding gas corresponding to the retrieved new sensor response by retrieving from the memory unit the characteristic curve which was measured with a calibration gas which was identical to the current shielding gas, and to retrieve from this characteristic curve the calibration gas flow rate which corresponds most closely to the retrieved new sensor response, and to identify this flow rate as the current flow rate of the shielding gas through the sensor apparatus.

7. A method for measuring the flow rate of a shielding gas through a sensor apparatus, wherein the method comprises:
    driving the shielding gas through the sensor apparatus, wherein the sensor apparatus comprises at least one inlet and at least one outlet, wherein the at least one inlet is in fluid connection with one or more bypass channels and with one or more sensor channels for leading fluid into the sensor apparatus, wherein the at least one outlet is in fluid connection with the same bypass channels and sensor channels for leading fluid out of the sensor apparatus as the at least one inlet, and wherein further one or more thermal mass flow sensors are connected to the one or more sensor channels;
    configuring a control unit to read a sensor response from the one or more thermal mass flow sensors and, upon retrieving a new sensor response, determine the corresponding flow rate of the shielding gas through the sensor apparatus based on the retrieved sensor response and calibration data, wherein the calibration data comprises one or more characteristic curves comprising gas flow values and sensor response values; and
    configuring the control unit to store the determined flow rate of the shielding gas in a memory unit;
    configuring the control unit to display the determined flow rate of the shielding gas to a user on a display unit or to transfer the determined flow rate of the shielding gas to other data processing units in a computer network,
    wherein the control unit is configured to determine the flow rate of the shielding gas corresponding to the retrieved new sensor response by
    retrieving a shielding gas temperature value from a temperature sensor within the sensor apparatus,
    retrieving from the memory unit the composition of the shielding gas, comprising the concentration percentage of each gas component in the shielding gas,
    retrieving from the memory unit the number of active thermodynamic degrees of freedom which the molecules of each gas component in the shielding gas possess at the retrieved shielding gas temperature,
    retrieving from the memory unit, for each gas component separately, a pure-gas characteristic curve which consists of sensor response data as a function of gas flow rate, measured in a calibration experiment conducted with a pure gas consisting only of that gas component,
    calculating a new, mixture-specific characteristic curve for the gas mixture as a weighted average of the pure-gas characteristic curves, wherein the weight assigned to each value on a pure-gas characteristic curve is a product of the concentration percentage of that gas component in the shielding gas mixture and the number of active thermodynamic degrees of freedom which the molecules of that gas component possess at the retrieved shielding gas temperature,
    using the mixture-specific characteristic curve as the characteristic curve for the shielding gas mixture by retrieving from this characteristic curve the calibration gas flow rate which corresponds most closely to the retrieved new sensor response, and
    identifying this flow rate as the current flow rate of the shielding gas through the sensor apparatus.

8. The method according to claim 7, wherein the control unit is configured to determine the flow rate of the shielding gas corresponding to the retrieved new sensor response by retrieving from the memory unit the characteristic curve which was measured with a calibration gas which was identical to the current shielding gas, retrieving from this characteristic curve the calibration gas flow rate which corresponds most closely to the retrieved new sensor response, and identifying this flow rate as the current flow rate of the shielding gas through the sensor apparatus.

9. The method according to claim 7, wherein the control unit is configured to retrieve temperature values from temperature sensors placed in the bypass channel or in the sensor channel, or integrated into the sidewalls of the sensor apparatus, and to calculate temperature corrections to the flow rate of the shielding gas based on the retrieved values.

* * * * *